United States Patent [19]

Wolcott

[11] Patent Number: 4,695,902
[45] Date of Patent: Sep. 22, 1987

[54] COLOR VIDEO PRINTER INCLUDES A COLOR VIEWER AND IMAGE ADJUSTMENT CONTROLS WHICH ARE INHIBITED DURING EXPOSURE

[75] Inventor: Dana W. Wolcott, Rochester, N.Y.

[73] Assignee: Eastman Kodak Company, Rochester, N.Y.

[21] Appl. No.: 776,233

[22] Filed: Sep. 16, 1985

[51] Int. Cl.$^4$ .......................... H04N 9/81; H04N 5/84
[52] U.S. Cl. ..................................... 358/332; 358/244; 358/76
[58] Field of Search .................. 358/244, 244.1, 244.2, 358/332, 76, 77, 78, 79, 80, 345

[56] References Cited

U.S. PATENT DOCUMENTS

| | | | |
|---|---|---|---|
| 2,295,628 | 9/1942 | Biedermann | 358/76 |
| 2,731,511 | 1/1956 | Wiesen | 178/5.4 |
| 2,995,619 | 8/1961 | Freeman | 178/5.2 |
| 3,644,664 | 2/1972 | Huboi et al. | 178/5.2 A |
| 3,684,365 | 8/1972 | Dahlquist et al. | 355/3 |
| 3,897,250 | 7/1975 | Weishaupt | 96/27 E |
| 3,934,081 | 1/1976 | Schumacher | 178/6.8 |
| 3,961,366 | 6/1976 | Weishaupt | 358/80 |
| 4,191,962 | 3/1980 | Sramek | 358/244 |
| 4,231,061 | 10/1980 | Freeman | 358/76 |
| 4,339,769 | 7/1982 | Fujita et al. | 358/6 |
| 4,373,156 | 2/1983 | Pfannkuch et al. | 340/70.3 |
| 4,396,279 | 8/1983 | Yoshikawa et al. | 355/43 |
| 4,468,693 | 8/1984 | Fujita et al. | 358/78 |
| 4,566,035 | 1/1986 | Samuel et al. | 358/244 |

FOREIGN PATENT DOCUMENTS 0070677 1/1983 European Pat. Off. .

Primary Examiner—Raymond F. Cardillo
Assistant Examiner—Robert A. Weinhardt
Attorney, Agent, or Firm—William F. Noval

[57] ABSTRACT

A color video printer having a color viewer for viewing a color video image before printing to permit evaluation of the image and if necessary, preprinting adjustments to the characteristics of the image. The color video printer includes a monochrome display device (CRT) for displaying an image of a color video signal to be copied and an exposure station which is located along a first optical path from the display device and at which is positioned a self-processing photographic element. An optical assembly is movable between a position out of the first optical path and a position intercepting the first optical path to establish a second optical path between the display device and a color image viewing station. First and second rotatable filters have respective red, green and blue filters which are sequentially moved into the first and second optical paths in synchronism with the field frequency of the video signal. A selectively actuatable coupling moves the optical assembly (1) to the position out of the first optical path to permit exposure of a self-processing photographic element located at the exposure station to a sequence of color field images produced by the CRT and the first filter, and (2) to the position establishing the second optical path to permit viewing at the viewing station of color images produced by the CRT and the second filter.

4 Claims, 9 Drawing Figures

COLOR VIDEO PRINTER INCLUDES A COLOR VIEWER AND IMAGE ADJUSTMENT CONTROLS WHICH ARE INHIBITED DURING EXPOSURE

CROSS-REFERENCE TO RELATED APPLICATIONS

U.S. patent application Ser. No. 776,234, entitled MICROPROCESSOR CONTROL FOR A COLOR VIDEO PRINTER, by Harold J. Barrett, filed Sept. 16, 1985,; U.S. patent application Ser. No. 776,232, entitled COLOR VIDEO PRINTER, by Dana W. Wolcott, filed Sept. 16, 1985; U.S. patent application Ser. No. 776,236 entitled WHITE COMPENSATION CIRCUIT FOR A COLOR VIDEO PRINTER, by Douglas W. Constable, filed Sept. 16, 1985; and U.S. patent application Ser. No. 776,231, entitled VIDEO SIGNAL PROCESSING CIRCUIT FOR A COLOR VIDEO PRINTER, by Douglas W. Constable, filed Sept. 16, 1985.

BACKGROUND OF THE INVENTION

In general, this invention relates to a color video printer for producing a color photographic copy from a color video signal. More particularly, this invention relates to a color video printer which has a color viewer for viewing a color video image before printing to permit evaluation of the image and, where desirable, preprinting adjustments to the characteristics of the image.

In producing a color copy from a color video signal, it is often desirable to evaluate the image so that any adjustments to the characteristics of the image may be made before copying. Although various video image copying devices have been proposed, these devices have generally been complex, expensive and difficult to operate. In many of these devices, the operator is provided with a viewer for viewing the video image prior to copying. One technique for producing a copy of a color video signal is to photograph the face of a color television with a color still camera. Although the television controls may be adjusted prior to photographing in order to adjust the video image to one's preference, this technique is disadvantageous in requiring the use of an expensive color television or video monitor to make a copy. Additionally, poor copy quality may result due to the difficulties (1) in synchronizing the shutter speed of the still camera with the frame rate of the video signal and (2) in positioning the camera relative to the monitor face to make the photographic image coincide with the monitor image.

In U.S. Pat. No. 4,468,693, entitled VIDEO PRINTING APPARATUS, by S. Fujita et al, issued Aug. 28, 1984, there is disclosed a complex and expensive video printing apparatus using a monochrome video monitor for producing a color print by filtering the monochrome images with stationary red, green and blue filters to produce sequential color images to which photographic film is exposed. The video image may be viewed on a separate color monitor prior to printing. This viewing technique is expensive and complex in the use of a color monitor solely for viewing and, therefore, is not readily applicable to a low cost video printer. The latter patent also discloses (FIG. 26) a monochrome CRT used with two stationary color filter wheels, one used in producing a color print and the other used in a shading correction circuit, but not in a viewing system. In U.S. Pat. No. 4,339,769 entitled PHOTOGRAPHY APPARATUS FOR TELEVISION PICTURE, by T. Fujita et al, issued July 13, 1982, there is disclosed apparatus for making a photographic print from a color video signal that includes a monochrome video monitor, a stationary color filter wheel and a camera. A waveform monitor is provided for separately viewing red, green, blue and luminance fields. In addition, viewing ports are provided to view the monochrome printing monitor in advance of the stationary color filter wheel. The latter apparatus is disadvantageous in the use of an expensive dedicated viewing monitor and in permitting direct viewing of only the monochrome image and not a color optical image produced by the printing monochrome CRT.

Although it has been proposed to use a monochrome monitor with a color filter wheel synchronized with the incoming video signal in order to view a video image before copying, such monitors have been used separately from the copying operation. Thus, in U.S. Pat. Nos. 4,231,061 and 2,995,619, separate diazo printing tubes are used for the copying operation so that the image produced by a monochrome tube and color filter wheel is not the image used to expose the copying material. A similar difficulty arises in the video color negative analyzers disclosed in U.S. Pat. Nos. 2,295,628 and 3,644,664 in which a slide or negative is scanned by means of a monochrome cathode ray tube (or flying spot scanner) and color filter wheel. The resulting video signal is applied to a similar monochrome imaging device and color filter wheel. In the latter patent, separate scanning and viewing assemblies are disclosed while in the former patent, the same monochrome CRT is used with synchronized scanning and viewing color filter wheels. However, in both patents copying of the negative is effected in a separate printing device.

Thus, there exists a need for a simple, inexpensive and easy to use viewer for a color video printer which obviates such difficulties.

SUMMARY OF THE INVENTION

According to the present invention, there is provided a color video printer having a color viewer which is simple, inexpensive and easy to use and which permits viewing of a color video image prior to copying to permit evaluation and preprinting adjustments to the characteristics of the image. The color video printer includes a monochrome display device (CRT) for displaying an image of a color video signal to be copied and an exposure station which is located along a first optical path from the display device and at which is located a self-processing photographic element. An optical assembly is movable between a position out of the first optical path and a position intercepting the first optical path to establish a second optical path between the display device and an image viewing station. First and second rotatable filters have respective red, green and blue filters which are sequentially moved into the first and second optical paths in synchronism with the field frequency of the video signal.

According to a feature of the invention, the same color image to which the photographic element is exposed is available prior to exposure for viewing at the viewing station. This is effected by a selectively actuatable coupling for moving the optical assembly (1) to the position out of the optical path to effect exposure and (2) to the position establishing the second optical path to permit viewing of the color video image at the viewing station.

According to another aspect of the invention, the printer includes image adjustment controls located adjacent to the image viewing station, and a cover which covers the viewing station and image adjustment controls in a closed position and uncovers them in an open position. Movement of the cover to the open position actuates the coupling to move the optical assembly to the viewing position so that an operator can evaluate a color video image and make adjustments to its characteristics before printing. Thereafter, movement of the cover to the closed position, actuates the coupling to move the optical assembly to the exposing position to permit exposure of the photographic element. At the same time, the image adjustment controls are covered so that adjustment of the image is inhibited during exposure.

DESCRIPTION OF THE DRAWINGS

In the detailed description of the invention presented below, reference is made to the accompanying drawings in which like elements are numbered with like numbers.

DESCRIPTION OF THE PREFERRED EMBODIMENT

In the following description of a color video printer including a color viewer according to the present invention, the printer will be described with respect to the processing of an NTSC color video signal which is the standard broadcast signal in the United States, Canada, Japan and other countries. It will be understood that the present invention may also be used with other broadcast standards such as the PAL and SECAM systems used in Europe and other parts of the world. In the NTSC system, a single color image is represented by a color video signal constituting a frame of two interlaced odd and even fields. Each color field signal includes luminance and chrominace components which encode three concurrent primary color component signals (red, green and blue). The color video signal is broadcast at 30 frames or 60 fields per second.

Figure 1:
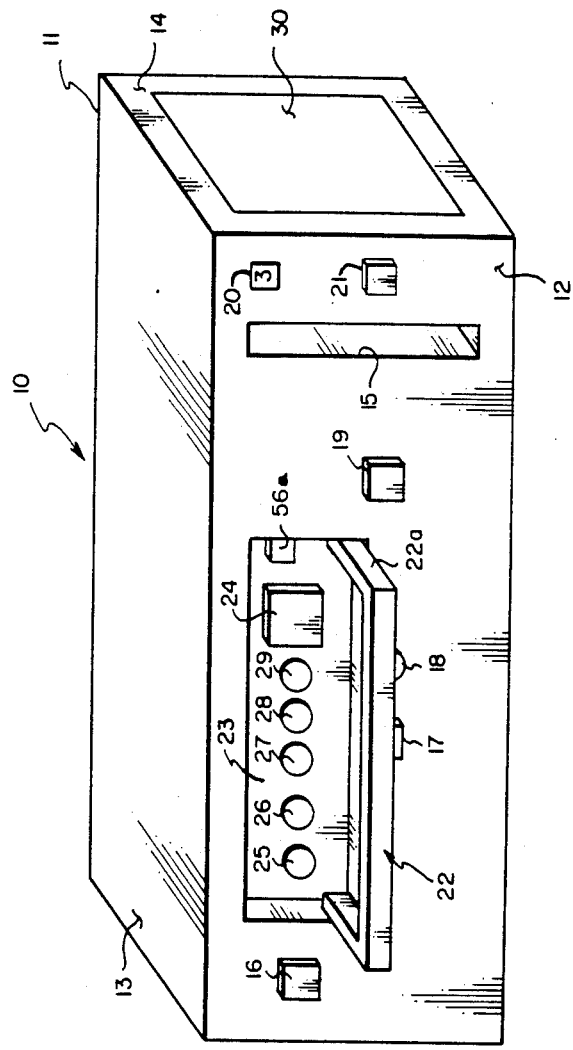
FIG. 1 is a perspective view of a color video printer including a color viewer according to the present invention.

Referring now to the figures, as shown in FIG. 1, printer 10 includes a housing 11 having a front panel 12, a top panel 13, and a side panel 14 with a door 30 for inserting packs of self-processing photographic elements into printer 10. Not shown are another side panel, a bottom panel and a rear panel. Front panel 12 includes a print ejection slot 15, a "POWER" switch 16, a "PRINT" switch 17, a "READY" light 18, an "NTSC/RGB" switch 19, an "EXPOSURE NUMBER" dial 20 and a latch 21. A cover 22 with lip 22a is mounted on panel 12 and is movable between an open position (as shown in FIG. 1) and a closed position. When cover 22 is in the open position, a recessed panel 23 is accessible to an operator for viewing and adjusting an image. Panel 23 includes an image viewer 24 and adjustable controls 25, 26, 27, 28 and 29 (to be explained later).

Figure 2:
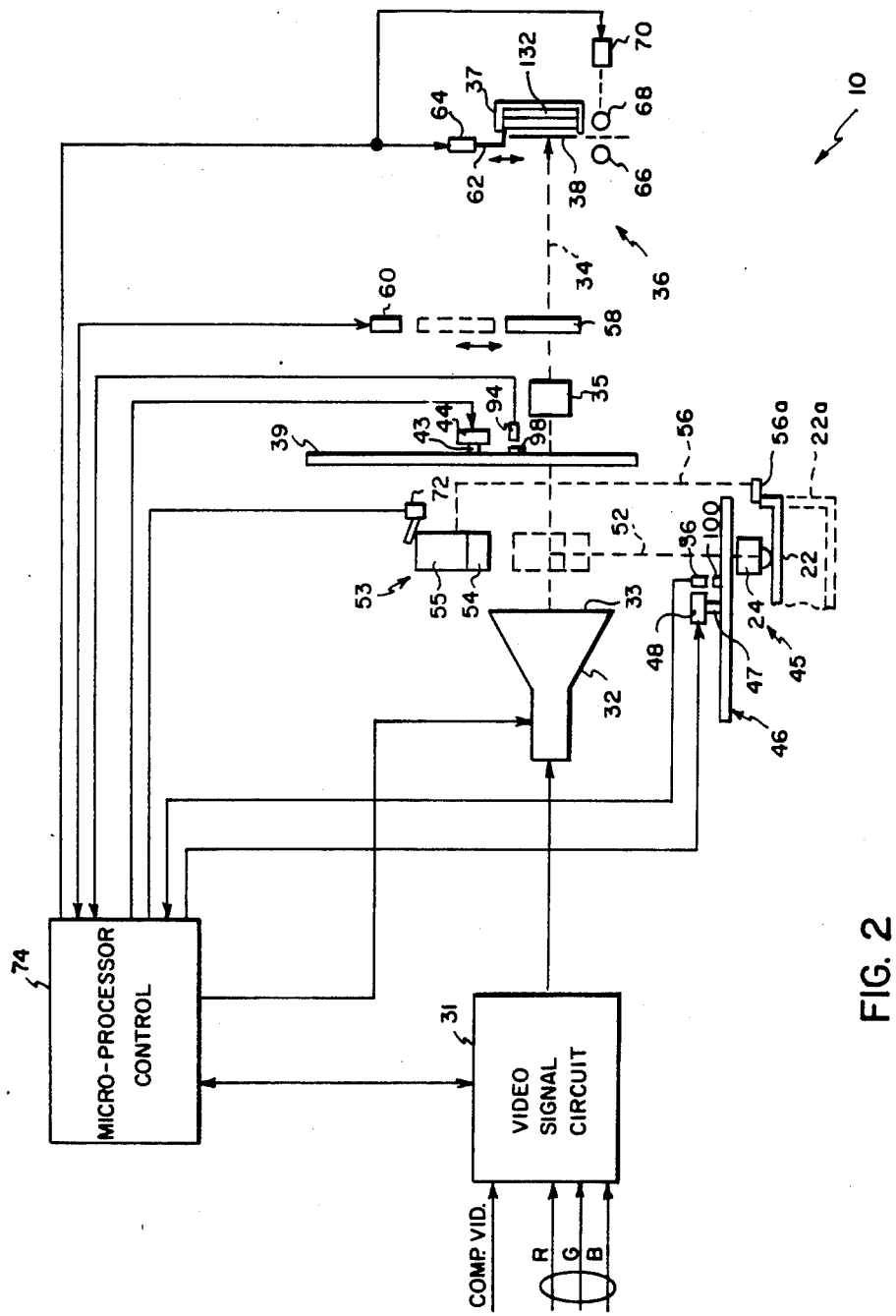
FIG. 2 is a partially schematic, partially diagrammatic view of the printer of FIG. 1.

Referring now to FIG. 2, there is shown a partially schematic, partially diagrammatic view of important components of printer 10. As shown, printer 10 includes a video signal circuit 31 which receives (by actuation of switch 19 on panel 12 in FIG. 1) either a composite color video signal having luminance and chrominance component video signals or an RGB component color video signal having three concurrent primary color signals constituting red (R), green (G), and blue (B) component video signals. The composite color video signal is illustratively described as being in the NTSC format which has a field frequency of sixty fields per second, or a frame frequency of thirty frames per second.

As will be explained in greater detail with respect to FIG. 3, video signal circuit 31 processes either a composite color video signal or an RGB component color video signal to provide a repetitive sequence of RGB primary color component video signals to a monochrome electronic display device such as a monochrome cathode ray tube (CRT) 32. The applied video signal is converted to a monochrome optical image which is displayed on the screen 33 of CRT 32. An exposure station 36 is located along a first (exposure) optical path 34 from CRT 32. Positioned at station 36 is a pack 37 of unexposed self-processing photographic elements 38.

A first (exposure) color filter wheel 39 has (see FIG. 6A) a red filter 40, a green filter 41, and a blue filter 42. Filter wheel 39 is mounted for rotation on shaft 43 and is driven by a motor 44 to sequentially move filters 40, 41 and 42 into optical path 34 in synchronism with the field frequency of the color video signal. Monochrome images displayed on screen 33 of CRT 32 are filtered by filters 40, 41 and 42 to produce color images projected to station 36 by projection lens 35.

Printer 10 also has a viewing station 45 at which an operator may view an image prior to making a print. Viewing station 45 includes a second (viewer) filter wheel 46 mounted on shaft 47 and driven by motor 48. Filter wheel 46 is similar in construction to filter wheel 39 and includes respective red, green and blue filters 49, 50 and 51 (see FIG. 6B) which are sequentially movable into a second (viewer) optical path 52 from CRT 32 to viewer 24. A mirror assembly 53, which includes mirrors 54 and 55, is movable between a position (as shown in solid lines in FIG. 2) which is out of the exposure optical path 34 and a position (as shown in dashed lines in FIG. 2) intercepting optical path 34 and establishing viewer optical path 52. As noted above, cover 22 is movable between a closed position (as shown in solid lines in FIG. 2) in which the viewer 24 is covered, and an open position (as shown in dashed lines in FIG. 2), in which the viewer 24 is uncovered so that an image displayed on CRT 32 may be viewed by an operator. When cover 22 is opened, mirror assembly 53 is moved by coupling 56 into optical path 34. When cover 22 is closed, lip 22a of cover 22 contacts finger 56a of coupling 56 to move mirror assembly 53 out of optical path 34 to permit printing of the image produced by CRT 32.

Figure 5:
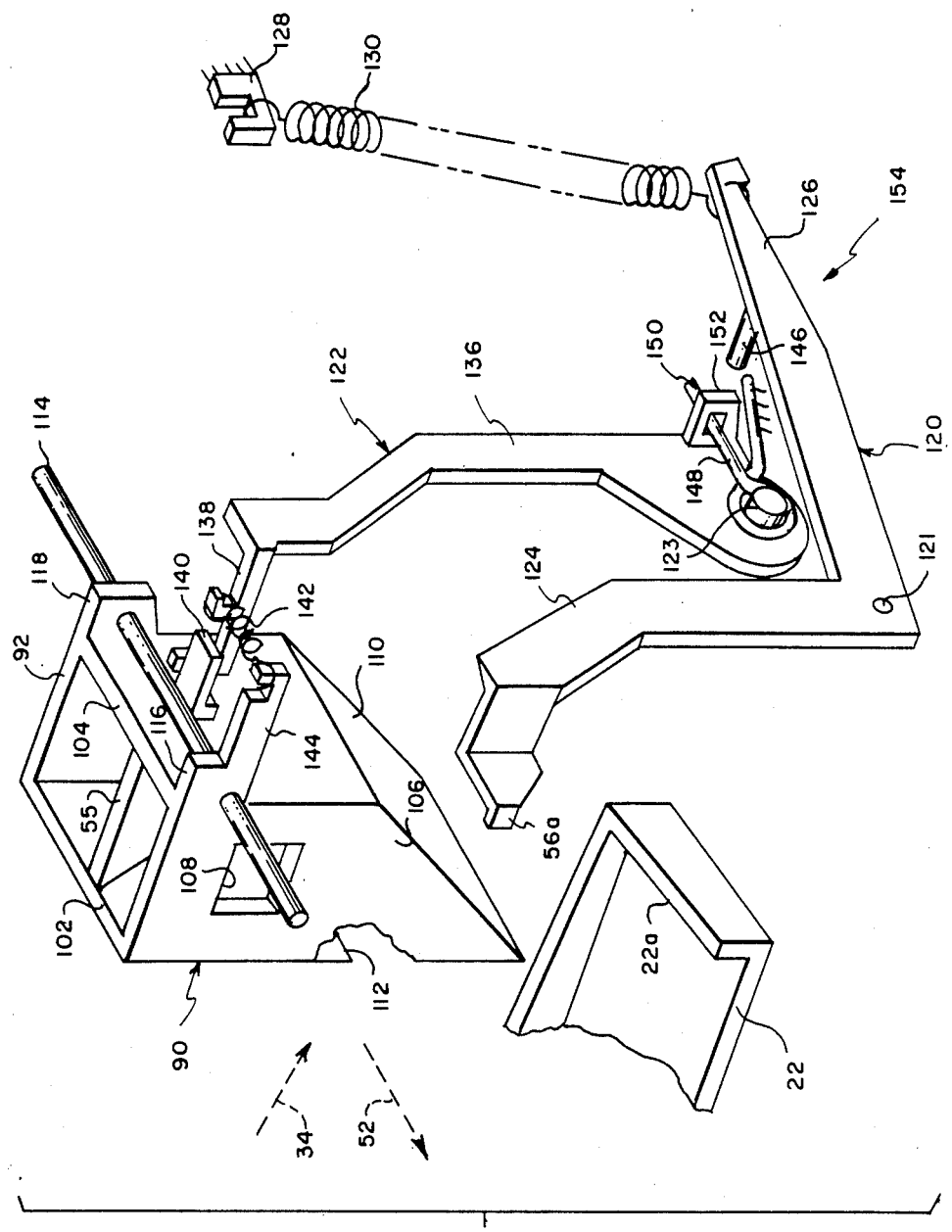
FIG. 5 is a perspective view of the optical assembly and coupling shown in FIG. 2.

Referring now to FIG. 5, there is shown in greater detail a preferred embodiment of optical assembly 53 and coupling 56. As shown, optical assembly 53 is in the viewing position and door 22 is open. Optical assembly 53 includes a housing 90 having a back wall 92, side walls 102 and 104, front wall 106 with viewing window 108 and sloping bottom wall 110 which supports mirror 54. Wall 102 has an opening 112 which faces face 33 of CRT 32. Housing 90 is slidably mounted on rod 114 by means of guides 116 and 118.

Coupling 56 includes a lever 120 which is rotatably mounted on pivot 121 and interacting lever 122 which is rotatably mounted on pivot 123. Lever 120 has an upwardly extending arm 124 having finger 56a and a rearwardly extending arm 126 which is attached to fixed post 128 by means of spring 130. Lever 122 includes arm 136 having a member 138. Member 138 engages a member 140 extending from the wall 104 of housing 90. A spring 142 extends between member 138 and extension 144 of guide 116 and biases members 138 and 140 together.

A pin 146 extends from arm 126 into engagement with spring 148 coiled about pivot 123. End 150 of spring 148 engages tab 152 of lever 122.

Figure 7A:
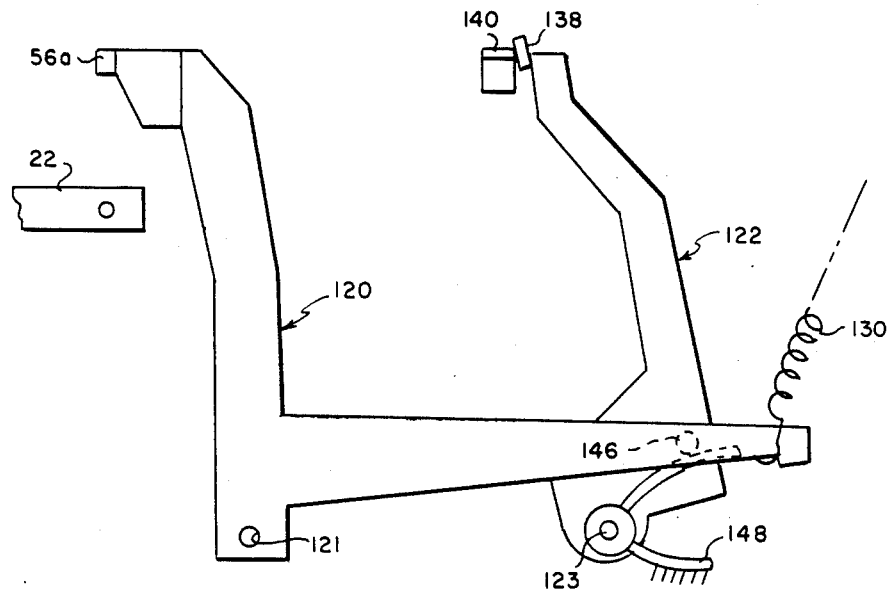
FIGS. 7A and 7B are elevational views respectively showing the optical assembly in the viewing position and in the exposing position.
Figure 7B:
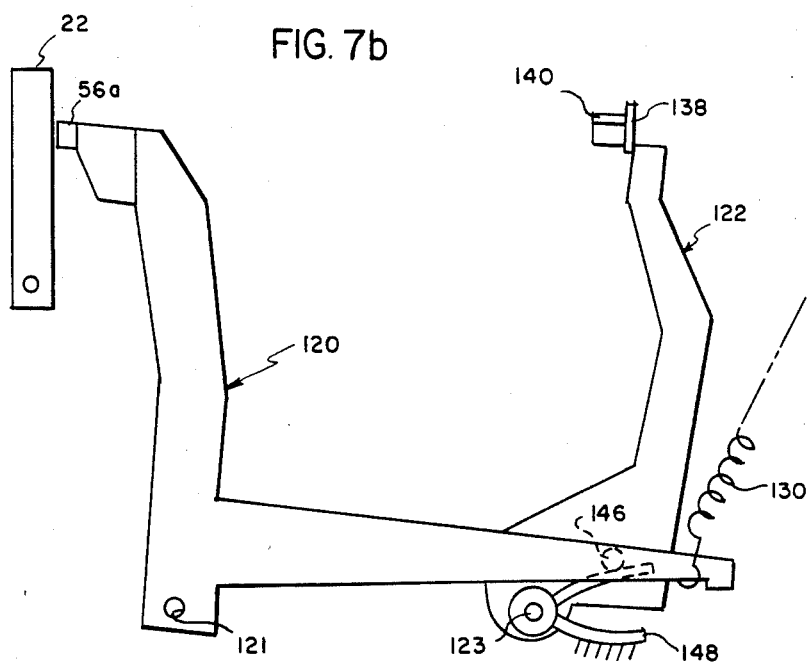

In operation, when door 22 is moved to the open position shown in FIG. 5 (See also FIG. 7A), from the closed position (See FIG. 7B), lip 22a is disengaged from finger 56a of lever 120. Tension spring 130 rotates lever 120 in a counterclockwise direction (in the direction of arrow 154) and spring 148 causes lever 122 to rotate in a counterclockwise direction. Member 138 of lever 122 exerts a force against member 140 of housing 90 to slide housing 90 along rod 114 to the viewing position (as shown in FIGS. 5 and 7A). When door 22 is closed, lip 22a contacts finger 56a to rotate lever 120 in a clockwise direction. Pin 146 is also moved clockwise bearing against spring 148 to rotate lever 122 in a clockwise direction to move housing 90 by means of spring 142 to the exposing position (See FIG. 7B).

Printer 10 (FIG. 2) includes a shutter 58 movable into and out of optical path 34 by means of solenoid 60. A print eject assembly includes a pusher arm 62 actuated by a solenoid 64 and a pair of processing and eject rollers 66 and 68 rotatably actuated by motor 70.

Printer 10 also includes a detector 72 for detecting when optical assembly 53 is out of path 34 (which indicates cover 22 is closed). Operation of printer 10 is controlled by microprocessor control 74 which includes a microprocessor (such as the INTEL 8051), programming of which is well known to those skilled in the art.

Figure 3:
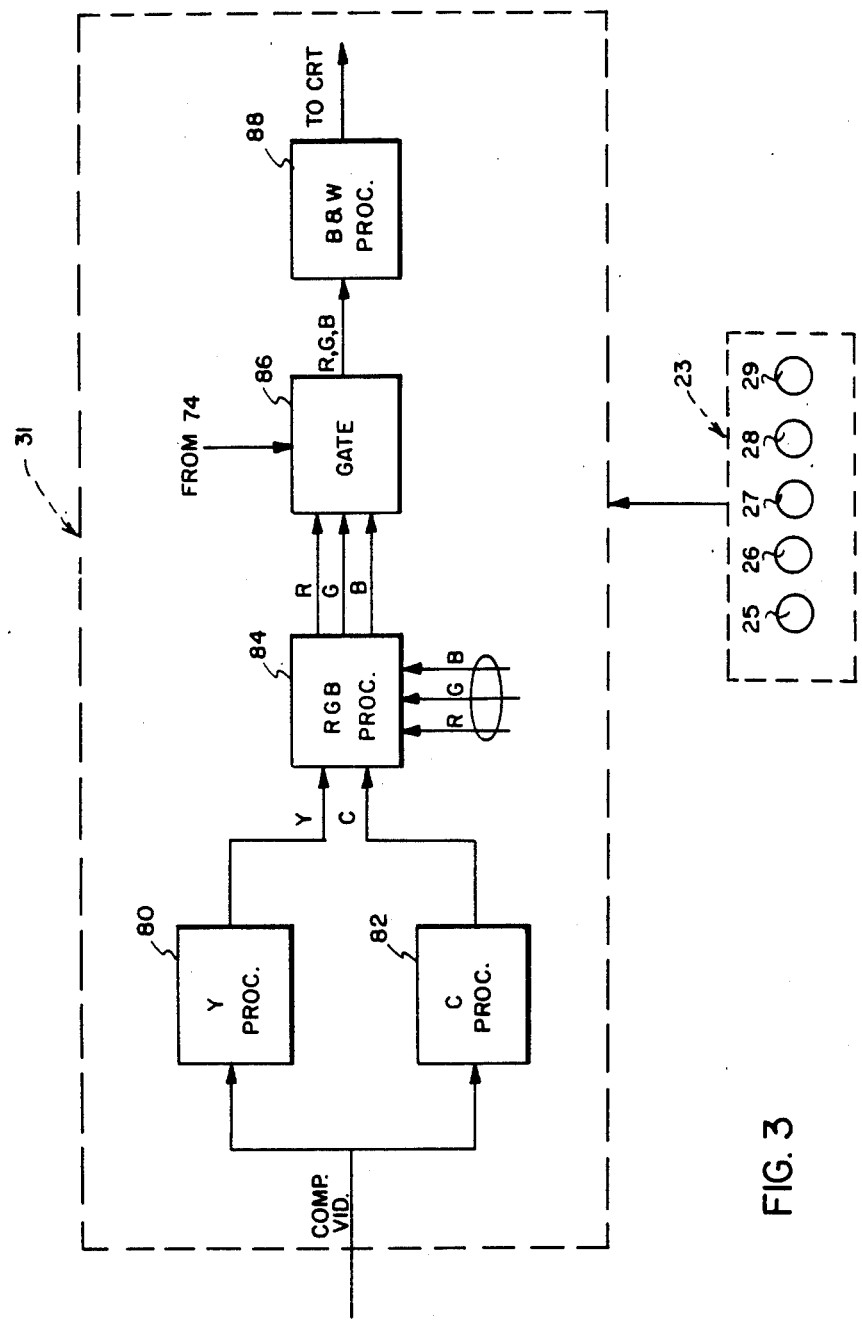
FIG. 3 is a block diagram showing in greater detail the video signal circuit shown in FIG. 2.

Video signal circuit 31 is shown in greater detail in FIG. 3. A composite color video signal received by video signal circuit 31 is applied to luminance (Y) processing circuit (Y PROC.) 80 and chrominance (C) processing circuit (C PROC.) 82. Circuits 80 and 82 respectively separate the Y and C component signals from the composite video signal. The luminance and chrominance signals are applied to RGB decode and processing circuit (RGB PROC.) 84 which decodes concurrent red (R), green (G) and blue (B) color component signals from the luminance and chrominance component signals. Circuit 84 also processes the R G B signals and applies them to gate 86. Gate 86 is controlled by microprocessor control 74 to select one of the three concurrent R, G or B component signals applied to it. The selected color component signal is then applied to a black and white processing circuit 88 before application to CRT 32.

The operator controls on sub-panel 23 include control 25 and control 26 which respectively control the color saturation and hue of the chrominance signal processed by circuit 82; a control 27 which controls the detail of the luminance signal processed by circuit 80 and controls 28 and 29 which control the black and white levels of the signal processed by circuit 88 before being applied to the CRT 32.

Features of video signal circuit 31 are described in greater detail in cross-referenced, copending U.S. patent application Ser. No. 776,236, entitled WHITE COMPENSATION CIRCUIT FOR A COLOR VIDEO PRINTER and cross-referenced, copending U.S. patent application Ser. No. 776,231, entitled VIDEO SIGNAL PROCESSING CIRCUIT FOR A COLOR VIDEO PRINTER.

Control of the operation of the printer 10 by means of microprocessor control 74 will now be described. A more detailed description of such operation is described in cross-referenced, U.S. patent application Ser. No. 776,234, entitled MICROPROCESSOR CONTROL FOR A COLOR VIDEO PRINTER. Actuation of switch 16 (FIG. 1) on front panel 12 turns printer 10 on. Control 74 turns on filter wheel motors 44 and 48 to rotate filter wheels 39 and 46, respectively. The rotational speed of wheels 39 and 46 is synchronized with the field frequency of the color video signal processed by printer 10. Since the illustrative NTSC field frequency is sixty fields per second (fps) and filter wheels 39 and 46 have three color filters, each of wheels 39 and 46 are rotated at twenty revolutions per second. The rotational speed of wheels 39 and 46 are respectively sensed by detectors 94 and 96 (FIG. 2) detecting identifying marks 98 and 100 respectively on wheels 39 and 46. As will be described later, marks 98 and 100 also indicate the positioning of the red filters 40 and 49 in optical paths 34 and 52.

Control 74 also applies power to CRT 32 to warm it up. After the CRT 32 is warmed up, a "READY" light 18 on panel 12 (FIG. 1) is turned on indicating to the operator that printer 10 is ready to make a photographic copy of a color video signal.

Figure 6A:
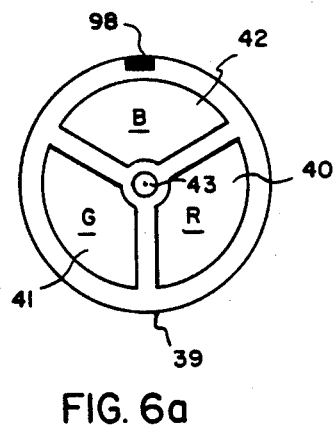
FIGS. 6A and 6B are frontal views respectively of the exposure and viewer filter wheels shown in FIG. 2.
Figure 6B:
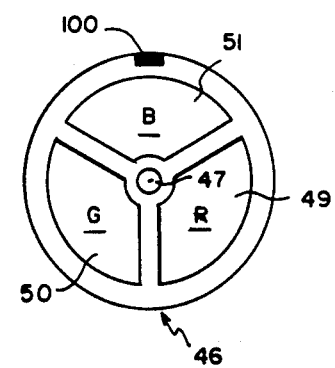

If a copy of a video signal is to be made without any adjustments to the image characteristics thereof (such as color, hue, detail, black and white levels), the operator actuates "PRINT" switch 17 on control panel 12. Upon initiation of the "print" operation, control 74 actuates solenoid 60 to move shutter 58 out of exposure optical path 34. When the mark 98 on filter wheel 39 has been detected by detector 94 to confirm that red filter 40 (FIG. 6A) of filter wheel 39 intercepts optical path 34, control 74 turns CRT 32 on and actuates gate 86 (FIG. 3) of video signal circuit 31 to select the red component video signal to be applied to CRT 32. CRT 32 converts the video signal to a monochrome optical image on screen 33 which is converted to a red optical image by red filter 40 (FIG. 6A). The red optical image is projected along path 34 by lens 35 to exposure station 36 to expose a self-processing photographic element 38 positioned at station 36. As filter wheel 39 continues to rotate to sequentially move green filter 41 and blue filter 42 into optical path 34, control 74 actuates gate 86 to sequentially select the corresponding green and blue component video signals to be applied to CRT 32. This sequence is repeated for another sequence of red, green and blue fields. Thus, a photographic element 38 is exposed to six color field images in the sequence red, green, blue, red, green, blue field images.

Figure 4:
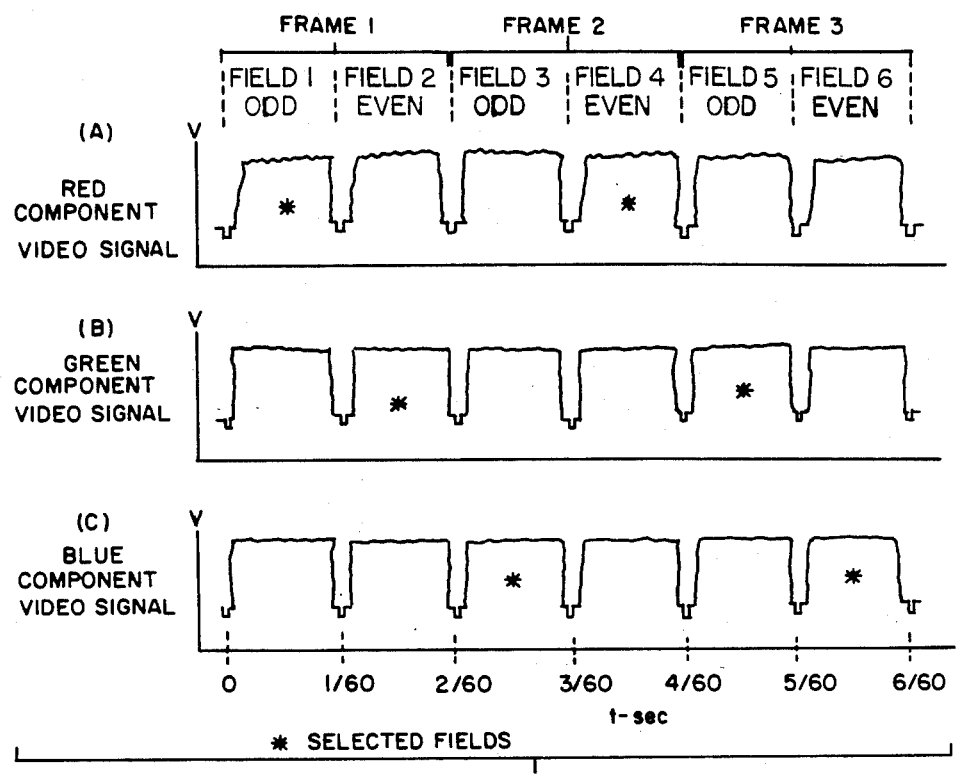
FIGS. 4A, 4B and 4C are respective video signal diagrams illustrating the operation of the printer shown in the Figures.

The sequence of exposure of element 38 is illustrated in FIG. 4. As shown, concurrent red (R), green (G) and blue (B) component video signals are applied by circuit 84 to gate 86 for a duration of three frames or six fields of color video signals. Each frame includes interlaced odd and even fields. Microprocessor control 74 is programmed to actuate gate 86 to select only one color component signal from each field of three concurrent color component signals for application to CRT 32. In FIG. 4, the selected color component signal is indicated by "*". Thus, in Field 1, the "odd" red component video signal is selected; in Field 2, the "even" green component video signal is selected, in Field 3, the "odd" blue component video signal is selected; in Field 4, the "even" red component video signal is selected, in Field 5, the "odd" green component video signal is selected; and in Field 6, the "even" blue component video signal is selected. Thus, self-processing photographic element 38 is exposed to a full resolution frame of a color video image having odd and even fields of each of red, green and blue primary colors. The exposure time of element 10 is relatively short-1/10 sec.

After exposure, control 74 turns off CRT 32 and actuates solenoid 60 to close shutter 58. Photographic element 38 is ejected from exposure station 36 by actuation of solenoid 64 to cause pusher rod 62 to move element 38 out of pack 37 into the nip of rollers 66 and 68 (dashed lines in FIG. 2) which are rotated by motor 70. As element 38 is moved through this nip, rollers 66, 68 rupture a pod of processing chemicals made integral with element 38 and spread the chemicals uniformly over the exposed image-forming area of element 38. Element 38 self-processes to a finished photographic print outside of printer 10. A particularly exemplary photographic element which may be used in printer 10 is the "Trimprint"$^R$ instant film pack sold by the Eastman Kodak Company, Rochester, N. Y.

After ejection of an exposed self-processing photographic element from exposure station through slot 15 in panel 12 (FIG. 1), printer 10 is ready to make another copy. Spring 132 of pack 37 urges an unexposed photographic element 38 into exposure station 36.

If the operator desires to make adjustments to the characteristics of the color image to be copied, he/she opens cover 22 to gain access to viewer 24 and image controls 25-29 (FIG. 1). As described above, optical assembly 53 is moved into optical path 34 by coupling 56 to establish viewing optical path 52 to viewer 24 (FIG. 2). After detecting red filter mark 100 of the viewer filter wheel 46, microprocessor control 74 turns on CRT 32 and actuates gate 86 to gate through to CRT 32, repetitive sequences of red, green and blue component video signals. Since viewer filter wheel 46 is synchronized with the field frequency of the incoming color video signal, the operator views the same color image that a photographic element 38 will be exposed to. By adjusting controls 25-29 on panel 12 (FIG. 1) the operator can change the color, hue, detail, black and white level characteristics of the color video image to be copied.

After the adjustments have been completed or if no adjustments are made, the operator closes cover 22 to move optical assembly 53 out of the exposure optical path 34. Exposure of a photographic element may then be effected.

Although coupling 56 for actuating optical assembly 53 has been described as a specific mechanical arrangement, it will be appreciated that other mechanical arrangements known to those skilled in the art may also be used. Coupling 56 may also comprise electromechanical and electronic arrangements for effecting movement of optical assembly 53 between its viewing and exposing positions.

The invention has been described in detail with particular reference to a preferred embodiment thereof, but it will be understood that variations and modifications can be effected within the spirit and scope of the invention.

What is claimed is:

1. Color video printer apparatus comprising:
   monochrome display means for displaying an image of a video signal;
   an exposure station which is located along a first optical path from said display means and at which is located a photographic element;
   an image viewing station;
   an optical assembly movable between an exposing position out of said first optical path and a viewing position intercepting said first optical path to establish a second optical path between said image viewing station and said display means;
   first and second continously moving color filters, each of which has first, second and third primary color filters sequentially movable into said respective first and second optical paths in synchronism with the field frequency of a video signal applied to said display means; and
   selectively actuatable means coupled to said optical assembly for moving said assembly (1) to said exposing position to permit the exposing of a photographic element at said exposure station to color images produced by said display means and said first color filter and (2) to said viewing position to permit the viewing at said image viewing station of color images produced by said display means and said second color filter.

2. The apparatus of claim 1 including cover means for covering said image viewing station and means for mounting said cover means for movement between (1) a closed position in which said cover means covers said viewing station and actuates said actuatable means to move said optical assembly to said exposing position; and (2) an open position in which said cover means uncovers said image viewing station and actuates said actuatable means to move said optical assembly to said viewing position.

3. The apparatus of claim 2 including image adjustment controls located adjacent to said image viewing station and wherein said cover means covers said image controls when in the closed position to prevent adjustment of said controls during exposure of said photographic element and uncovers said image adjustment controls in said open position to allow adjustment of said controls during viewing of an image on said viewer.

4. Color video printer apparatus comprising:
   a monochrome cathode ray tube (CRT) for displaying an image of a video signal;
   an exposure station which is located along a first optical path from said CRT and at which is located a photographic element;
   a color image viewing station;

an optical assembly movable between an exposing position out of said first optical path and a viewing position intercepting said first optical path to establish a second optical path between said CRT and said color image viewing station;

video signal means for applying to said CRT a color video signal which has a standard broadcast field frequency and which comprises repetitive sequences of red, green and blue component signals;

first and second continously rotatable color filters each of which has red, green and blue filters sequentially moved into said respective first and second optical paths in synchronism with the field frequency of said video signal so that a color filter is moved into said path which corresponds in color to the color component signal applied to said CRT; and selectively actuatable means coupled to said optical assembly for moving said assembly (1) to said exposing position to permit the exposure of said photographic element at said exposure station to color images produced by said display means and said first color filter; and (2) to said viewing position to permit the viewing at said color image viewing station of color images produced by said CRT and said second color filter.

* * * * *